(12) United States Patent
Regimbal (10) Patent No.: US 9,891,674 B2
(45) Date of Patent: Feb. 13, 2018

(54) INFORMATION HANDLING SYSTEM PLANAR INTEGRATED BUTTON TOUCH PAD ASSEMBLY

(71) Applicant: Dell Products L.P., Round Rock, TX (US)

(72) Inventor: Laurent A. Regimbal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/060,814

(22) Filed: Mar. 4, 2016

(65) Prior Publication Data

US 2017/0255230 A1 Sep. 7, 2017

(51) Int. Cl.
*G06F 1/16* (2006.01)
(52) U.S. Cl.
CPC ............ *G06F 1/169* (2013.01); *G06F 1/1656* (2013.01)
(58) Field of Classification Search
CPC ...................................... G06F 1/169
See application file for complete search history.

(56) References Cited

U.S. PATENT DOCUMENTS

| 2009/0174678 | A1* | 7/2009 | Mathew | G06F 1/1616 345/173 |
| 2011/0080354 | A1* | 4/2011 | Chiang | G06F 3/03547 345/173 |
| 2014/0211396 | A1* | 7/2014 | Shiroishi | G06F 1/1671 361/679.18 |
| 2014/0293157 | A1* | 10/2014 | Hoshi | G06F 1/169 349/12 |
| 2015/0160750 | A1* | 6/2015 | Wu | G06F 3/016 345/173 |
| 2016/0188020 | A1* | 6/2016 | Tan | G06F 3/03547 345/174 |
| 2016/0357277 | A1* | 12/2016 | Tzeng | G06F 3/03547 |
| 2016/0370910 | A1* | 12/2016 | Park | G06F 3/0383 |

* cited by examiner

*Primary Examiner* — Anthony Q Edwards
(74) *Attorney, Agent, or Firm* — Terrile, Cannatti, Chambers & Holland, LLP; Robert W. Holland (57) ABSTRACT

A portable information handling system integrated button touch pad provides consistent functional displacement with support of a touch surface from separate main and click brackets. The click bracket provides consistent displacement relative to a housing and a support plane so that an integrated button touch pad adapts to different housing sizes and materials with a common support arrangement of the touch surface and a common functional displacement feel provided by flexing of a main bracket that directly supports a touch pad relative to fixed click pad position.

20 Claims, 6 Drawing Sheets

FIG. 7

INFORMATION HANDLING SYSTEM PLANAR INTEGRATED BUTTON TOUCH PAD ASSEMBLY

BACKGROUND OF THE INVENTION

Field of the Invention

The present invention relates in general to the field of information handling system integrated input devices, and more particularly, to an information handling system planar integrated button touch pad assembly.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically integrate input and output (I/O) devices in a portable housing so that end users can interact with the information handling system on-the-go. The smallest portable housings tend to have only touchscreen display that serves as both the input and output device. For example, portable smartphone and tablet devices typically have a one-piece planar housing that has a touchscreen display integrated in one side. End users view information with the display and input information with touches made at the display, such as at a depiction of a keyboard. Although convenient due to their small size, touchscreen displays tend to be awkward for users who need to make large data inputs, such as when working with word processing. Portable information handling systems that have larger housings also have space to integrate a physical keyboard into the housing. A common housing configuration for integrating a physical keyboard is a clamshell or convertible configuration in which a main housing rotationally couples to a lid housing. The main housing typically integrates processing components and the keyboard while the lid housing integrates a display. Rotating the lid housing open exposes the display in an elevated viewing position and the keyboard below the display for convenient use.

Integrating a keyboard in an information handling system improves end user interactions by enhancing how inputs are mechanically performed, however, end users also tend to make inputs through a pointing device, such as a mouse. Larger-sized portable information handling systems will sometimes include an integrated touchpad or integrated button touch pad that accepts pointing device inputs. For example, the main housing integrates the keyboard in a portion located near the hinges and a capacitive touchpad is placed in front of the keyboard to accept touch inputs. An end user makes touch inputs by touching and dragging a finger across the touchpad to move the cursor on the display. An end user can also typically make a left or right mouse click input by touching separate buttons placed at the base of the touchpad. An integrated button touch pad differs from a touchpad in that the integrated button touch pad provides the user with a solid touch surface that does not have separate buttons. Instead, the end user presses on a corner of the integrated button touch pad to make a button input by moving the solid touching surface on the side of the intended input.

One difficulty with integrating a integrated button touch pad into a portable information handling system housing is that housings of different sizes tend to have integrated button touch pads of different dimensions. The X and Y dimensions of an integrated button touch pad tend to increase in proportion to the size of the portable housing, with larger housings having larger integrated button touch pads based upon the amount of room available on the main housing upper surface. The Z dimension, however, tend to depend more upon ID concept of the portable housing, such as housing materials and appearance. In order to adapt to different-sized housings, conventional integrated button touch pads typically include brackets and spring mechanisms that are modified for each unique system design. Such modifications often negatively impact integrated button touch pad performance, such as by changing the force and amount of displacement associated with a click input. Variance in performance tends to arise with introduction of mounting corrections, such as bent sheet metal tabs and features that have large tolerances relative to the intended displacement associated with ideal functional displacement.

SUMMARY OF THE INVENTION

Therefore, a need has arisen for a system and method which provides an information handling system integrated button touch pad having uniform displacement performance across variable housing profiles and Z dimensions.

In accordance with the present invention, a system and method are provided which substantially reduce the disadvantages and problems associated with previous methods and systems for adapting an integrated button touch pad into housings having variable housing profiles and Z dimensions. A touch surface is supported at an information handling system upper housing with first and second support brackets that may be disposed in a common support plane. Presses of the touch surface at a click-input location have a more consistent displacement regulated by the support brackets in a similar manner across different types of hardware platforms.

More specifically, a portable information handling system processes information with processing components disposed in a portable housing, such as a housing having rotationally coupled main and lid portions. An integrated button touch pad disposed on an upper surface of the main housing portion accepts end user touch inputs, such as by moving a cursor on a display responsive to movement of a finger across a touch surface device. The front end of the integrated button touch pad moves relative to the housing upper surface in response to an end user press to accept an end user input. Motion of the touch surface responsive to the end user press is regulated with a click bracket that supports the front end of the integrated button touch pad and a separate main bracket that supports the rear end of the integrated button touch pad. The click and main brackets normalize motion of the touch surface by moving independent relative to each other. For example, the main bracket extends from the rear of the upper surface main housing portion and flexes relative to the click bracket during end user presses that actuate a dome switch supported by the click bracket.

The present invention provides a number of important technical advantages. One example of an important technical advantage is that high precision elements are combined in a manner that provides flexibility in Z height arrangement of the integrated button touch pad within an information handling system housing while maintaining consistent functional displacement. In one embodiment, all key functional elements of the integrated button touch pad assembly are maintained in a constant plane when assembled in housings having different thicknesses and materials. The planar design of the integrated button touch pad assembly and coupling bracket allows the same integrated button touch pad part to scale across multiple information handling system sizes having a range of Z height parameters. An end user has the same press feel and press distance to make an input so that a uniform end user experience is attained across different system platforms.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling integrated button touch pad provides consistent touch input feel with separate front and rear support brackets that regulate press response. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
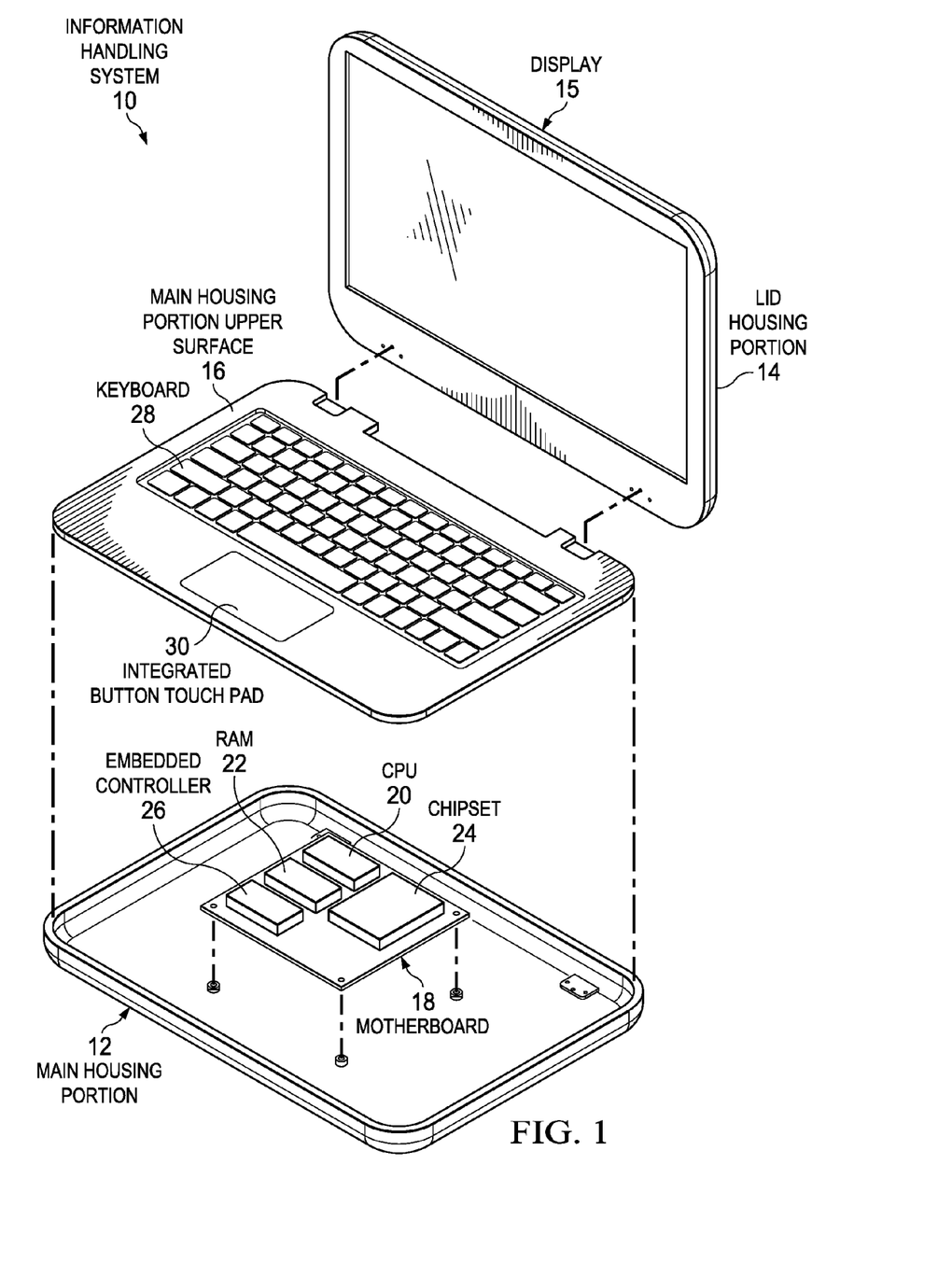
FIG. 1 depicts a blown up view of a portable information handling system having an integrated button touch pad in an upper housing surface.

Referring now to FIG. 1, a blown up view depicts a portable information handling system 10 having an integrated button touch pad 30 in an upper housing surface 16. Portable information handling system 10 is built from a main housing portion 12 rotationally coupled to a lid housing portion 14 in a clamshell configuration that rotates between closed and open positions. In the example embodiment, lid housing portion 14 includes a display 15 that displays information as visual images. Main housing portion 12 interfaces processing components with each other through a motherboard 18. In the example embodiment, motherboard 18 interfaces a central processing unit (CPU) 20 with random access memory (RAM) 22 to execute instructions and process information. A chipset 24 includes controllers and firmware, such as BIOS, that coordinates interactions between processing components. In particular, an embedded controller 26 coordinates input and output of information, such as inputs from keys of a keyboard 28 and inputs of points and presses from an integrated button touch pad 30. Keyboard 28 and integrated button touch pad 30 are integrated into the main housing upper surface 16 with keyboard 28 located at the rear portion nearer display 15 and integrated button touch pad 30 located at the front portion. In alternative embodiments, alternative configurations may be used. For example, processing components such as CPU 20 may be located in lid housing portion 14 with display 15 configured to act as a detachable tablet system having a keyboard base in main housing portion 12. As another example, the size and relative location of integrated button touch pad 30 may vary based upon the type of housing platform into which integrated button touch pad 30 is integrated.

Figure 2:
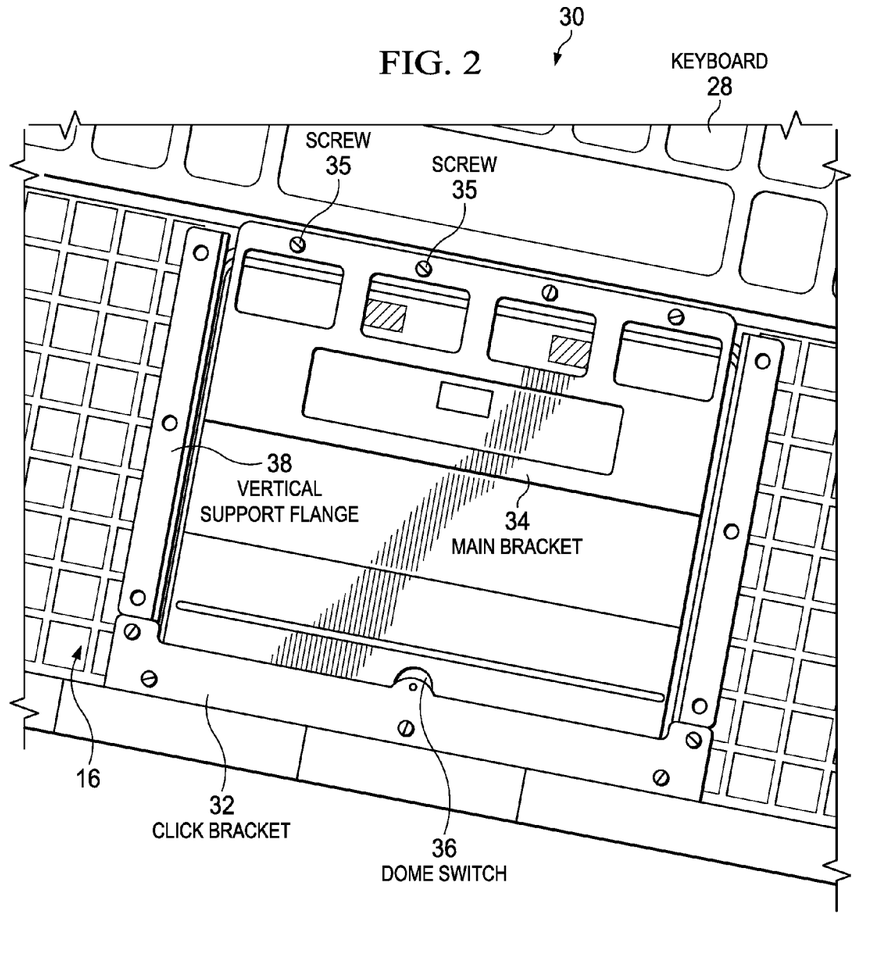
FIG. 2 depicts a bottom front view of an integrated button touch pad installed in a portable information handling system upper housing surface.

Referring now to FIG. 2, a bottom front view depicts an integrated button touch pad 30 installed in a portable information handling system 10 upper housing surface 16. In the example embodiment, integrated button touch pad 30 is installed in front of keyboard 28 at the front portion of upper surface 16. Integrated button touch pad 30 is depicted from a bottom view to illustrate flexibility provided by a support having multiple portions to aid regulated displacement functionality of touch pad 30 in response to an end user press. A click bracket 32 supports the front portion of integrated button touch pad 30 and is separate from a main bracket 34 that supports a rear portion of integrated button touch pad 30. A dome switch 36 is coupled to touch PCA 42 and supported against click bracket 32. Upon a press at a touch surface over main bracket 34, dome switch 36 provides a signal in response to the end user press on the touch pad 30 as downward movement of main bracket 34 actuates dome switch 36 against click bracket 32. Main bracket 34 couples directly to upper surface 16, such as with screws 35 secured at threaded inserts across the rear portion and bottom side of upper housing surface 16. Vertical support flange brackets 38 provide reinforcement to upper surface 16 as needed with a flange underneath upper surface 16 to support touch pad 30 and prevent excessive housing torsion. For example, upper surface 16 acts as a palm rest for end user typing inputs at keyboard 18 with an opening to accept touch pad 30 that is reinforced by vertical support flange 38 where less rigid materials are used for upper surface 16, such as plastic as opposed to metal, and where the size of integrated button touch pad 30 is large, such as in a housing having a larger-sized dimensions, so that additional support from vertical support flange brackets 38 may be desired. The separate click bracket 32 located at the front of integrated button touch pad 30 tends to reinforce upper surface 16 and regulates press input feel by offering a consistent support surface at the location of the press input at dome switch 36 and independent of the integrated button touch pad 30 size.

In operation, touch pad 30 accepts click inputs introduced by an end user press at touch pad 30 that is sufficient to flex main bracket 34 and actuate dome switch 36 against click bracket 32. Main bracket 34 flexes about its attachment by screws 35 at the lower side of main housing portion 12 upper surface 16 to provide a regulated displacement functionality for actuation of dome switch 36. Click bracket 32 provides a relatively non-flexing support surface that maintains a firm support to press dome switch 36 against. The click input is detected by actuation of dome switch 36 with the input attributed to a right or left click based upon the side of the touch pad 30 pressed upon by the end user.

Figure 3:
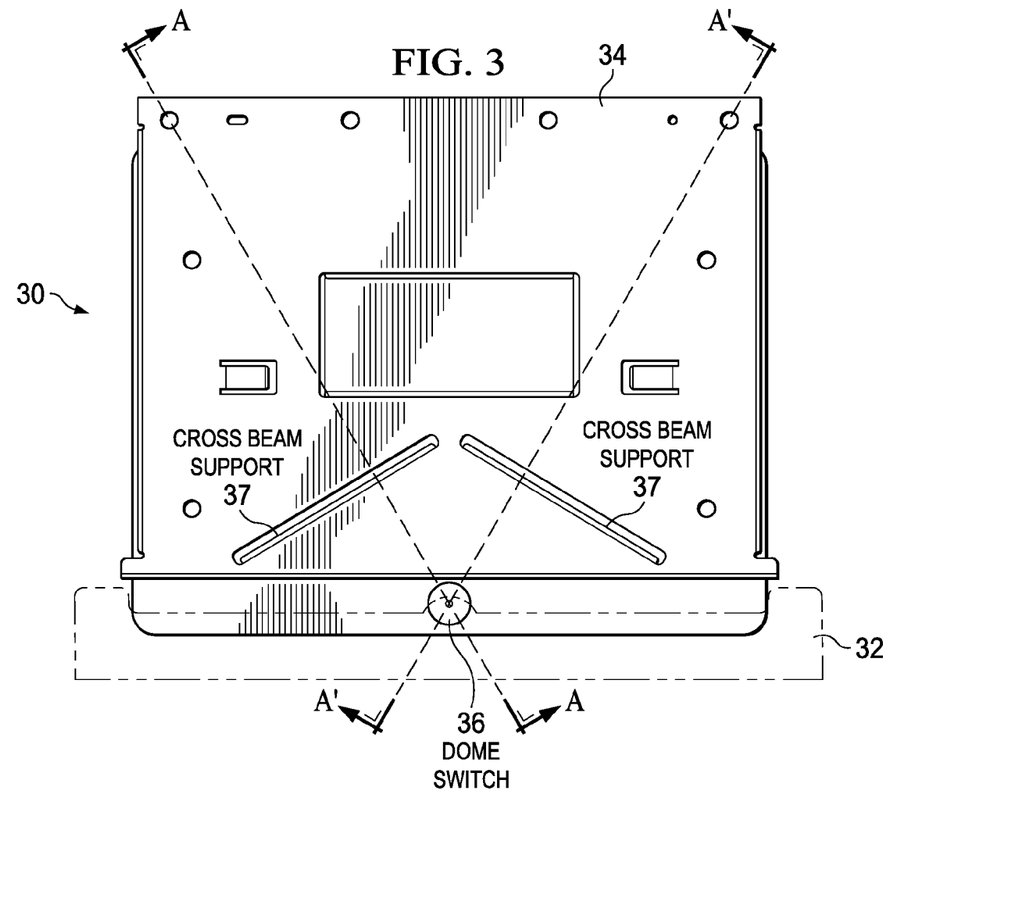
FIG. 3 depicts an integrated button touch pad with a cross beam support that aids regulated deflection when installed into a portable information handling system.

Referring now to FIG. 3, an integrated button touch pad is depicted with a cross beam support 37 that aids regulated deflection when installed into a portable information handling system. Main bracket 34 behaves like a plate with a cantilever hinge at the front portion of integrated button touch pad 30 where click bracket 32 (shown with dotted line) is located to engage against dome switch 36. The cantilever hinge and dome switch 36 create a secondary bending line along the line between the outer mounting screw and dome switch 36, indicated by A-A in FIG. 3. Cross beam supports 37 provide additional stiffness perpendicular to the bend line and create a more uniform and predictable force deflection response across the width of the touch surface. On a press at the touch surface, main bracket 34 deflects to bring dome switch 36 into contact with click bracket 32. Deflection of main bracket 34 is provided by bending along the upper mount (i.e., cantilever action) and the secondary bending line between dome switch 36 and the outermost screw mounting main bracket 34 to the lower surface of main housing portion 12 upper surface 16, as encouraged by the placement of crossbeam 37.

Figure 4:
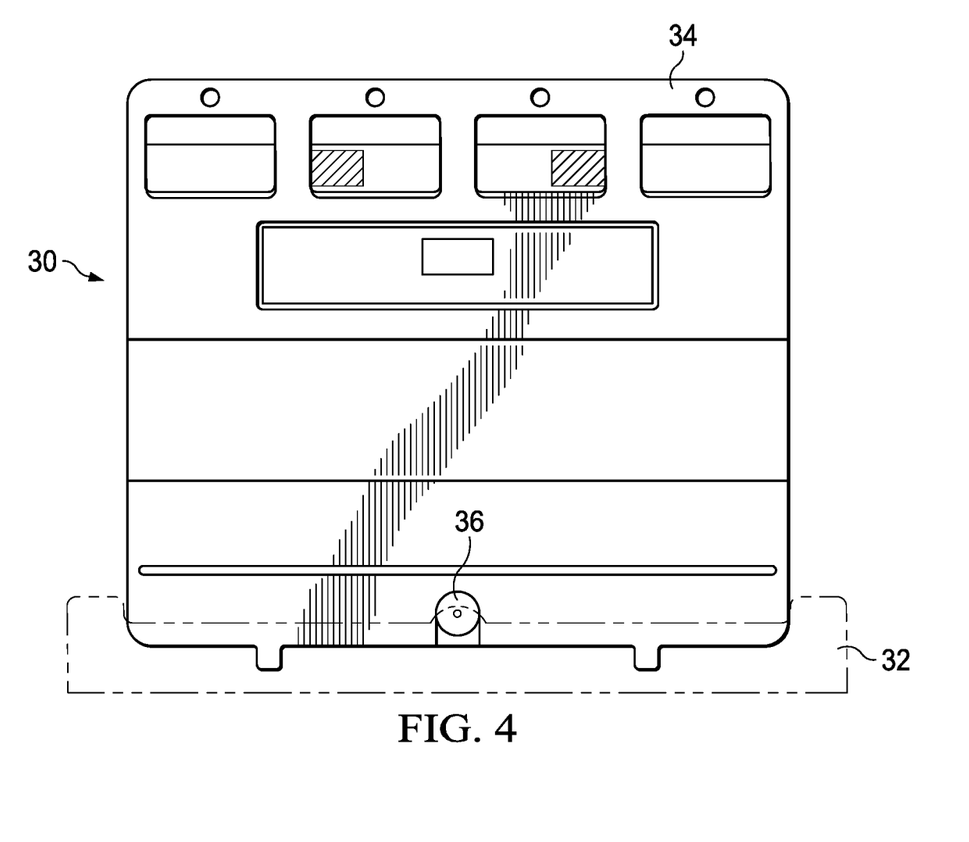
FIG. 4 depicts an integrated button touch pad having multiple separate support brackets before assembly of a touch surface.

Referring now to FIG. 4, an integrated button touch pad 30 is depicted having multiple separate support brackets before assembly of a touch surface. The distance between click bracket 32 and main bracket 34 may differ based upon the size of the touch surface to be attached. Selectively adding crossbeams of varied thickness or openings at main bracket 34 helps adapt a common click bracket 32 and main bracket 34 assembly to varying housing configurations with a consistent press functionality and feel. In various embodiments, click bracket 32 and main bracket 34 remain in a constant and common support plane relative to support surface 16 to minimize variance in Z height of integrated button touch pad 30 for different housing configurations. In addition, minor variations in bracket structure adapts touch pad feel to different sizes and shapes for different types of portable information handling systems. For example, main bracket 34 and click bracket 32 may be formed from different materials and different thicknesses of the same material to aid deflection response in a desired manner.

Figure 5:
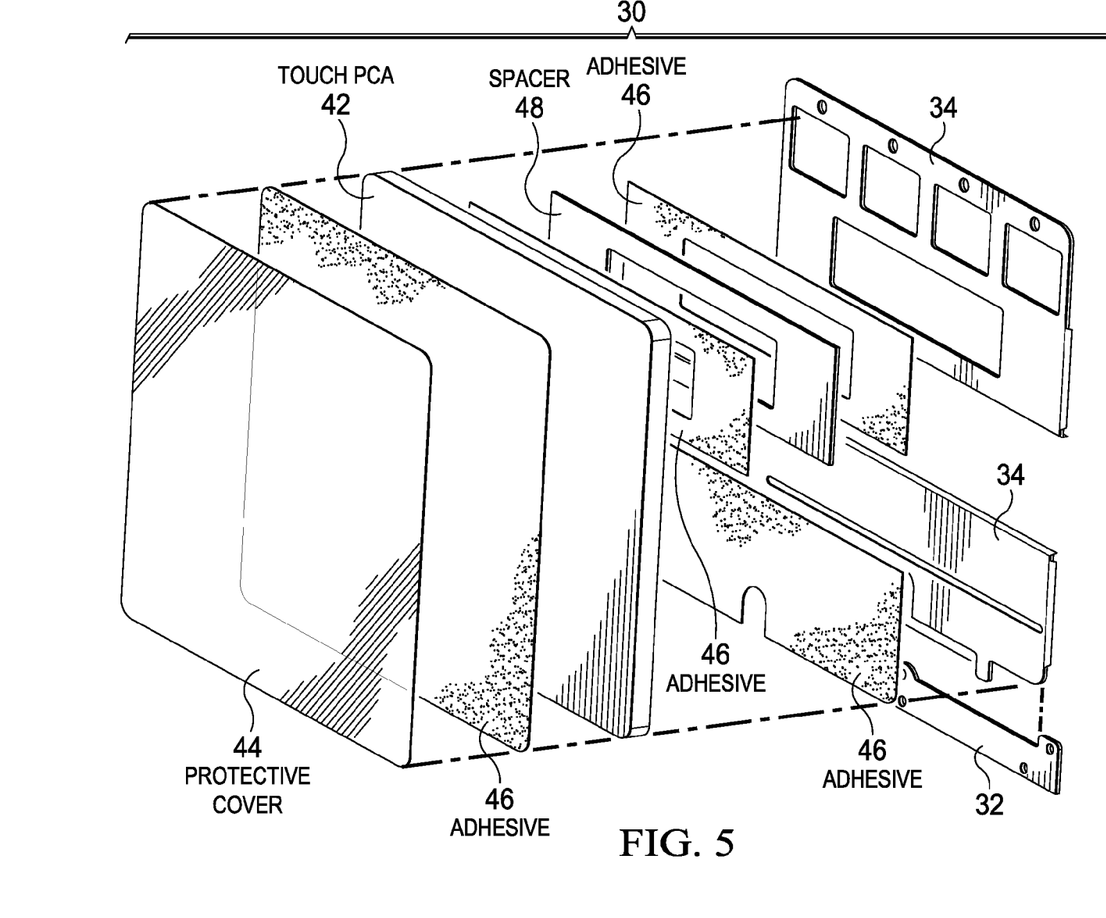
FIG. 5 depicts a blown up view of an integrated button touch pad before assembly into an installable component.

Referring now to FIG. 5, a blown up view depicts an integrated button touch pad 30 before assembly into an installable component. A touch PCA 42 provides a touch surface to detect touch inputs by an end user and interfaces with an embedded controller to communicate the touch inputs. A protective cover 44, such as Mylar, is coupled to an upper face of touch surface 42 with an adhesive 46. Underneath touch surface 42 support is provided by a main bracket 34, shown in the example embodiment as a two piece main bracket 34 assembled with adhesive to couple to touch PCA 42. A spacer 48 is disposed between main bracket 34 and touch PCA 42 to adjust the height of the assembled touch pad 30 as desired. Adhesive 46 couples the underside of touch surface 42 to main bracket 34 and spacer 48 so that the support provided underneath touch surface 42 is provided along a common support plane. Spacer 48 may vary in size to adapt a common set of main bracket 34 components to different-sized housings. In the example embodiment, main bracket 34 includes a seam that provides an enhanced deflection zone responsive to presses made at touch surface 42. A click bracket 32 is depicted proximate and separate from main bracket 34 in the approximate alignment provided by assembly of click bracket 32 to the main housing portion. Dome switch 36 (not shown) is coupled to the bottom face of touch PCA 42 and aligned to contact click bracket 32 upon flexing of main bracket 34.

Figure 6A:
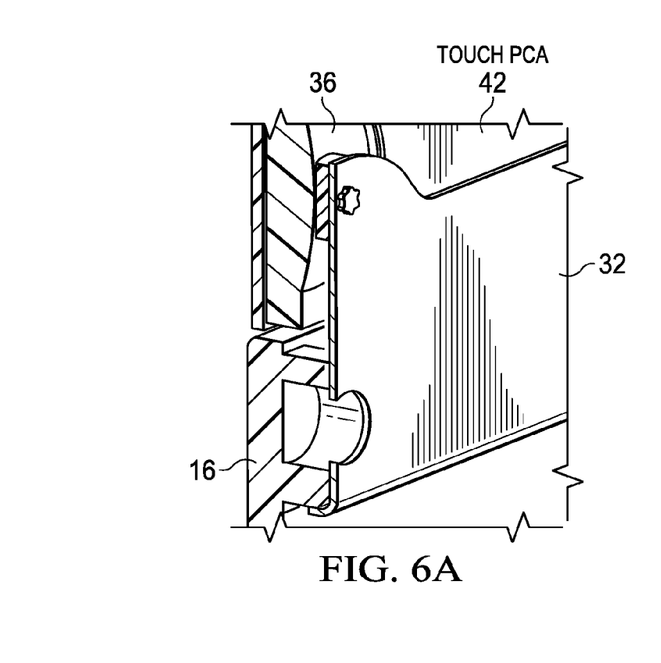
FIGS. 6A and 6B depict an integrated button touch pad having a click bracket with a dome switch activation support region.
Figure 6B:
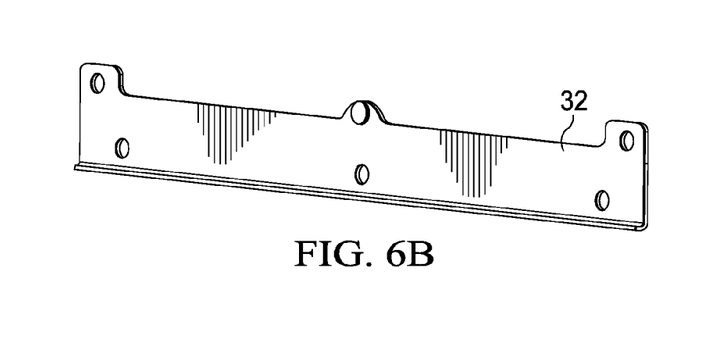

Referring now to FIG. 6, an integrated button touch pad 30 having a click bracket 32 is depicted with a dome switch 36 activation support region. Dome switch 36 is, for example, a press activated switch coupled to touch pad PCA 42 that detects press inputs by a user against an upper surface of touch pad PCA 42 when dome switch 36 contacts click bracket 32. Flexible material, such as rubber or a spring, which compresses and expands in response to pressure may be applied between click bracket 32 and dome switch 36 to aid in achieving a desired touch feel. Touch PCA 42 couples to a separate main bracket 34 (not shown) that flexes in response to a user press at touch PCA 42 so that dome switch 36 lowers towards click bracket 32 to generate a press event indicating a click input at the touch pad 30. Click bracket 32 in the example embodiment couples to the system housing with screws and remains substantially firm in its position that is fixed in Z height relative to the support plane. In the example embodiment, click bracket 32 supports a press input detection at touch surface 42 independent of main bracket 34 so that the functional displacement responsive to an end user press is defined primarily by the position of click bracket 32 and, separately, the flexibility of main bracket 34.

Figure 7:
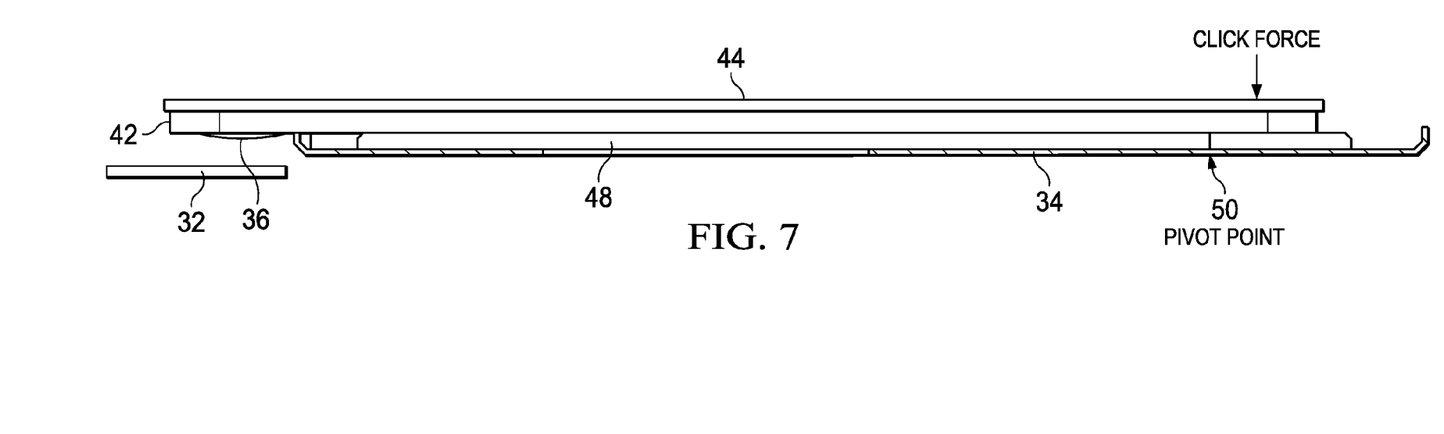
FIG. 7 depicts a side view of an installed integrated button touch pad having separate front and rear supports.

Referring now to FIG. 7, a side view depicts an installed integrated button touch pad 30 having separate front and rear supports. Integrated button touch pad 30 is held in a support plane so that presses on the front portion of integrated button touch pad 30 nearer to click bracket 32 introduce an input with significantly less pressure than presses on the rear of integrated button touch pad 30 supported by main bracket 34. To increase the force needed to generate a press input at the rear of integrated button touch pad 30, a pivot point 50 is introduced for rotation of touch surface 42 to center about the pivot point in the rear of integrated button touch pad 30. For example, a desired pivot point response is created by the relative height of spacer 48 with respect to touch PCA 42. For instance, a taller spacer has the effect of moving the pivot point towards the front of touch PCA 42 while a shorter spacer has the effect of moving the pivot point towards the rear of PCA 42. In the example depicted by FIG. 7, counterclockwise rotation is encouraged in response to any touch made in the front 90% of touch surface 42, while clockwise rotation away from click input is encouraged for presses made at the rear of touch surface 42. As a result, a touch input from a rear press requires a much greater force than a front press so that an input does not actually take place unless sufficient force is provided to move the entire touch surface 42 in a downward direction. Added flexibility provided by a shorter support length of click bracket 32 and the longer leverage arm of main bracket 34 aids in the translation of a downward press into an input at the front of integrated button touch pad 30.

FIG. 7 illustrates the "laminated" design of support for touch surface 42 that provides flexibility in the use of a common support structure across multiple housing platforms. Click bracket 32 in combination with a separate main bracket 34 regulates movement of touch surface 42 by providing a common response to downward force at the front of an integrated button touch pad 30 where press inputs are intended to be made and detected. Main bracket 34 restricts movement of touch surface 42 at its rear portion with a stiffer connection to an information handling system housing, such as directly to the housing with screws and threaded inserts.

Click bracket 32 and main bracket 34 form a support plane that provides a minimal Z height for small housing configurations, however, spacer 48 adapts to greater Z height housing configurations by increasing thickness to provide housing-specific height configurations.

Although the present invention has been described in detail, it should be understood that various changes, substitutions and alterations can be made hereto without departing from the spirit and scope of the invention as defined by the appended claims.

What is claimed is:

1. A portable information handling system comprising:
a housing having an upper surface;
a processor disposed in the housing and operable to execute instructions to process information;
a memory disposed in the housing and interfaced with the processor, the memory operable to store the information;
a controller disposed in the housing and interfaced with the processor, the controller operable to accept end user inputs from one or more input devices and to communicate the end user inputs to the processor; and
an integrated button touch pad disposed on the housing upper surface and interfaced with the controller, the integrated button touch pad having a touch surface operable to accept end user touches as inputs and to communicate the touches to the processor, the integrated button touch pad having a contiguous touch surface supported by a main bracket and a separate click bracket, the main bracket flexing to provide movement of the touch surface relative to the housing upper surface, the click bracket providing a reference surface for detection of a press by the touch surface.

2. The portable information handling system of claim 1 wherein the main bracket and click bracket are disposed in a common plane relative to the housing upper surface.

3. The portable information handling system of claim 1 wherein the main bracket and click bracket each couple separately to the housing upper surface.

4. The portable information handling system of claim 3 wherein the main bracket couples to the housing upper surface only along a rear surface.

5. The portable information handling system of claim 3 wherein the main and click brackets each support the touch surface without a direct interconnection to each other.

6. The portable information handling system of claim 1 wherein the housing comprises a main portion and a lid portion, the integrated button touch pad disposed in the main portion, the lid portion having a display operable to present the information as visual images.

7. The portable information handling system of claim 6 wherein the keyboard, processor and memory are disposed in the main portion.

8. The portable information handling system of claim 6 wherein the processor and memory are disposed in the lid portion.

9. A method for interfacing with a portable information handling system, the method comprising:
disposing an integrated button touch pad on an upper surface of the portable information handling system housing;
supporting a first portion of the integrated button touch pad on the upper surface with a main bracket disposed in a support plane;
supporting a second portion of the integrated button touch pad on the upper surface with a click bracket disposed in the support plane, the click bracket separate from the main bracket; and
accepting presses at the integrated button touch pad as inputs, the presses performed at the first portion and translated relative to the support plane with flexing of the main bracket for contact by an input device of the touch pad against the click bracket.

10. The method of claim 9 further comprising adapting a height of the integrated button touch pad with a spacer disposed between the touch pad and main bracket.

11. The method of claim 10 further comprising directly supporting a touch surface of the integrated button touch pad with both the main bracket and the click bracket without a direct interconnection between the main bracket and the click bracket.

12. The method of claim 11 wherein disposing an integrated button touch pad on an upper surface of the portable information handling system further comprises disposing the integrated button touch pad on a main housing portion rotationally coupled to a lid housing portion, the lid housing portion having an integrated display operable to present information as visual images.

13. The method of claim 11 wherein the keyboard, processor and memory are disposed in the main portion.

14. The method of claim 11 wherein the processor and memory are disposed in the lid portion.

15. A portable information handling system integrated button touch pad comprising:
a touch surface operable to detect touches and communicate the touches to a controller as inputs to an information handling system;
a first bracket supporting a first portion of the touch surface in a support plane; and
a second bracket supporting a second portion of the touch surface in the support plane;
wherein the touch surface moves responsive to a press at the second portion, the touch surface movement communicated to the portable information handling system as an input by flexing the second bracket to press the first portion against the first bracket.

16. The portable information handling system integrated button touch pad of claim 15 wherein the first bracket couples to the portable information handling system with a first flange, and the second bracket couples to the portable information handling system with second flange, the second flange separate from the first flange.

17. The portable information handling system integrated button touch pad of claim 15 wherein the first bracket directly supports the touch surface only when the touch surface is pressed down to make a input.

18. The portable information handling system integrated button touch pad of claim 15 wherein first and second brackets support the touch surface without a direct interconnection to each other.

19. The portable information handling system integrated button touch pad of claim 18 further comprising a spacer disposed in the support plane between the second bracket and the touch surface.

20. The portable information handling system integrated button touch pad of claim 19 wherein the spacer supports the touch surface between the first and second brackets.

* * * * *